Patented Aug. 8, 1933

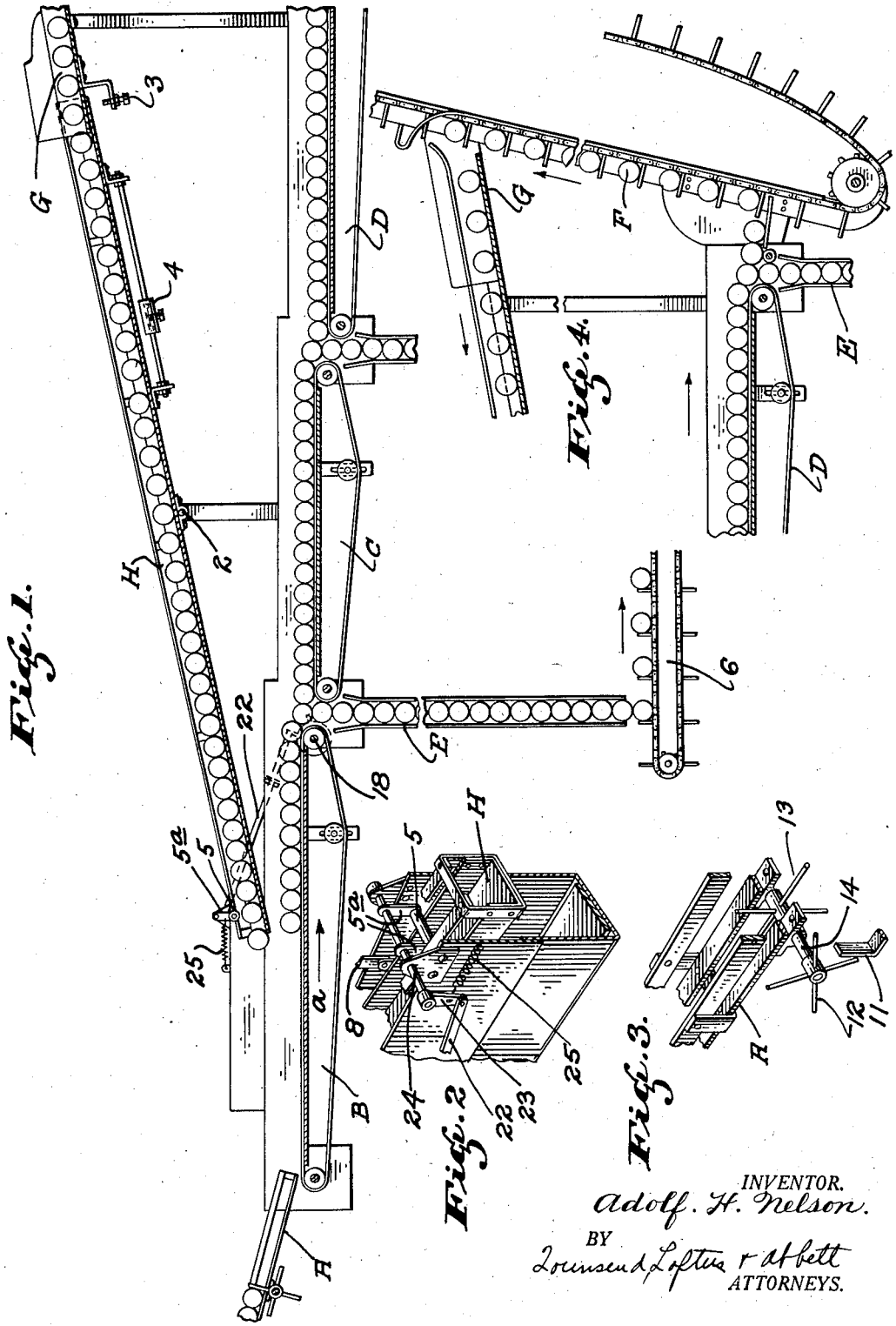

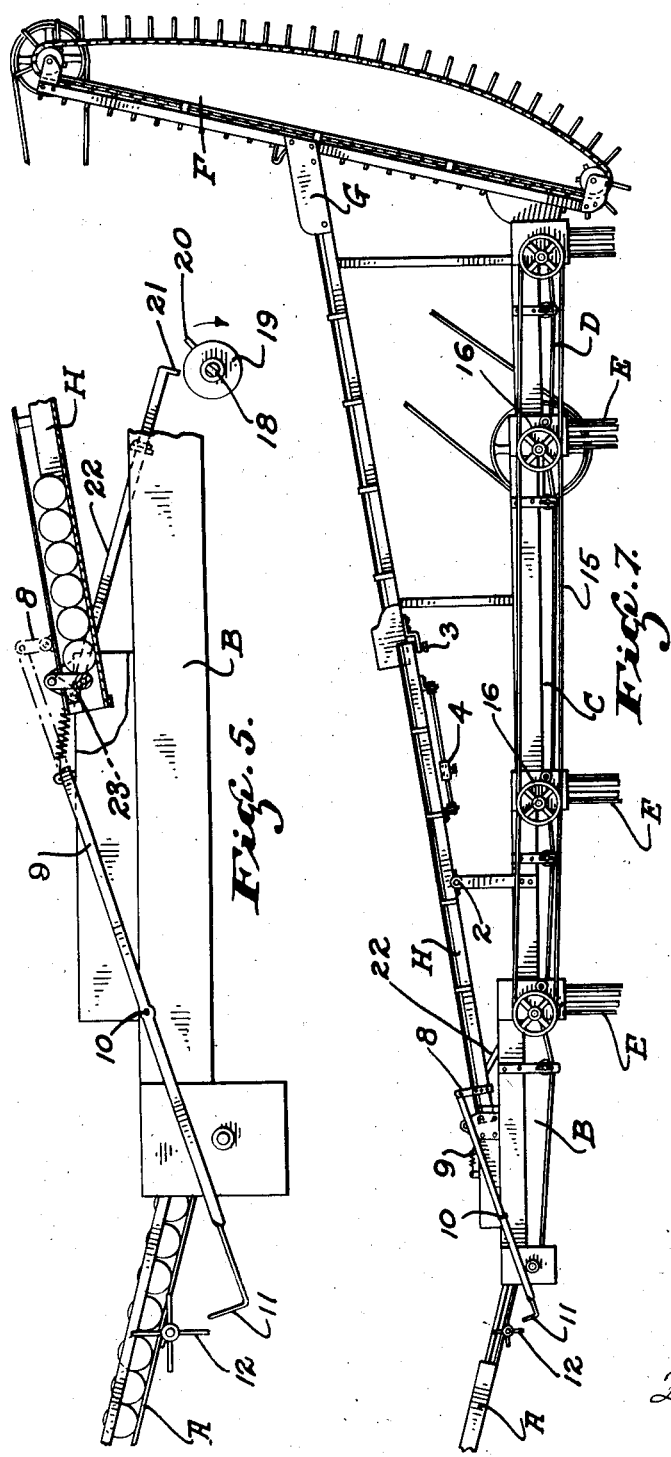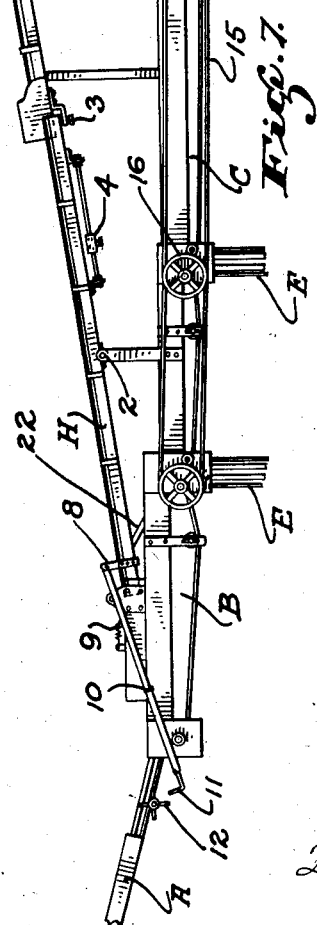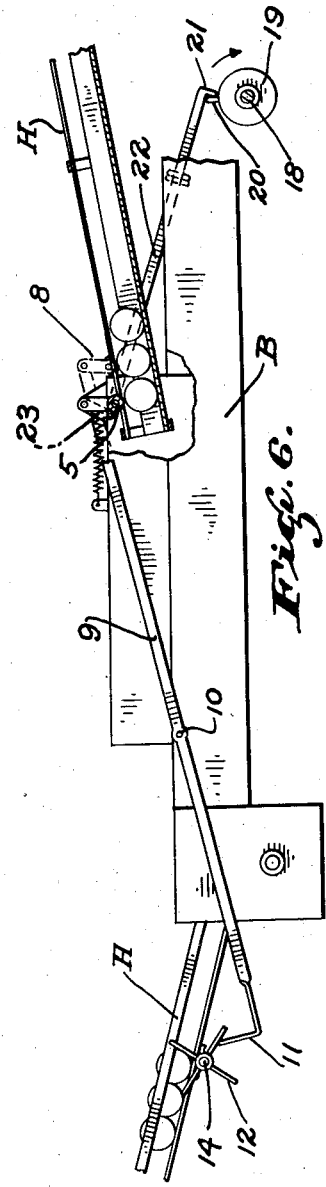

1,921,577

UNITED STATES PATENT OFFICE 1,921,577

CAN FEEDING SYSTEM

Adolf H. Nelson, San Francisco, Calif.

Application March 2, 1931. Serial No. 519,381

7 Claims. (Cl. 198—85)

This invention relates to a can feeding system and particularly that type where cans delivered by a main delivery chute or conveyor are distributed and delivered to a plurality of can receiving chutes from where they are removed one by one as required.

In can feeding systems of the character described it often happens that the removal of cans from the receiving chutes is variable and in some instances is entirely stopped for considerable periods of time, hence it is necessary to provide a main delivery chute or conveyor having a capacity sufficient to take care of a rapid or maximum rate of removal of cans from the receiving chutes and also to provide means for stopping or regulating the supply of cans delivered by the main supply chute or conveyor when the removal of cans from the receiving chutes is at a slower or minimum rate as there would otherwise be an over supply of cans and possible piling up and jamming of cans in the system.

The object of the present invention is to generally improve and simplify the construction and operation of can feeding systems of the character described; to provide a system embodying a main supply chute or conveyor, a plurality of can receiving chutes, and conveying means for distributing the cans from the main conveyor or supply chute to the respective can receiving chutes; to provide means for removing cans from the distributing conveyor when a surplus number of cans are being delivered by the main supply conveyor or chute; to provide a chute whereby the removal of surplus cans are returned to the distributing conveyor; and, further, to provide means actuated by the passage of the surplus cans through a return chute whereby the delivery of cans from the main conveyor to the distributing conveyor is regulated.

The can feeding system is shown by way of illustration in the accompanying drawings, in which—

Fig. 1 is a central, vertical, longitudinal section showing the mechanism comprising the can feeding system.

Fig. 2 is a perspective view of the discharge end of the return chute.

Fig. 3 is a perspective view of the discharge end of the main supply chute.

Fig. 4 is an enlarged vertical section of the conveyor whereby surplus cans are removed from the distributing conveyors.

Figs. 5 and 6 are enlarged views of the mechanism actuated by the return chute; Fig. 5 showing the main delivery chute in operation and delivering cans to the distributing conveyors, and Fig. 6 shows the position of the mechanism when the supply of cans from the main delivery chute is shut off.

Fig. 7 is a side elevation of the mechanism shown in Fig. 1.

Referring to the drawings in detail and particularly Fig. 1, A indicates a main supply chute whereby cans are delivered to a series of distributing conveyors generally indicated at B, C and D. Interposed between the distributing conveyors are vertically disposed can receiving chutes such as indicated at E and disposed at the end of the distributing conveyor D is a substantially vertically disposed conveyor F whereby surplus cans are removed as will hereinafter be described.

The conveyor F when removing surplus cans delivers the same to a chute indicated at G and this in turn delivers the cans to a chute indicated at H and this in turn returns or delivers the cans to the first distributing conveyor indicated at B. The conveyor H is pivotally supported as at 2. The amount of pivotal movement permitted is regulated by an adjusting screw such as indicated at 3. The pivoted chute is provided with an adjustable counterweight 4 and a stop member in the form of a rocker arm 5, see Fig. 2, is positioned adjacent the discharge end of the chute to normally stop the passage or flow of cans through the chute.

The main function of a distributing system such as here illustrated is that of maintaining the receiving chutes E in a filled condition. The cans are removed one by one from the lower ends of these chutes. The removal may be automatic, for instance, by means of a conveyor such as shown at 6 or the cans may be removed by hand. The rate of removal from the several chutes E may be fast or slow and may at times be entirely stopped. It is accordingly essential to provide the main supply chute such as indicated at A which has a capacity sufficient to take care of a maximum rate of removal of cans from the chutes E and it is also necessary to provide means whereby the rate of delivery from the chute A may be regulated or entirely stopped as a surplus of cans would otherwise accumulate on the distributing conveyors B, C and D when the rate of removal from the chutes E is at a minimum and when removal is completely stopped.

In the present instance the delivery of cans from the chute A is either at a constant rate or entirely shut off and a predetermined number of cans in the form of a surplus is permitted to accumulate and to be recirculated through the return chutes indicated at G and H. This is accomplished as follows:

In actual operation when cans are being delivered at a constant rate of speed from the main supply chute A to the conveyor B, the cans will first discharge into the first vertical chute indicated at E and when this is filled the cans will pass over to the conveyor C thereby filling the second chute E and so on and if it should happen that all the chutes become filled there will be a discharged from the last conveyor D and such surplus cans will be removed by the vertical conveyor F. The surplus cans are elevated by this conveyor to the chute G and run by gravity from this chute into the pivoted chute H and as such will accumulate at the lower end thereof as they cannot discharge therefrom due to the stop member indicated at 5. When a predetermined number of cans have accumulated at the lower end of the pivoted chute H the weight thereof overbalances the counterweight 4 and the discharge end of the chute H will move downwardly away from the stop member 5 as indicated in Fig. 6 and the cans will thus discharge and will be deposited on the distributing conveyor B to be recirculated. When chute H becomes overbalanced and drops as shown in Fig. 6 movement is transmitted through link 8 to a rocker arm 9 which is pivoted at a point indicated at 10. The opposite end of this rocker arm is provided with a hook-shaped member 11 and this moves into engagement with a pin wheel 12. There are two pin wheels, see Fig. 3, one at 12 at the side of the main supply chute and one at 13 centrally of the main supply chute. The pin wheels are both secured on the shaft 14 and when an interlock is made between the member 11 and the pin wheel 12 the pin wheel 13 comes to a stop and the delivery of cans from the main supply chute to the distributing conveyors is accordingly shut off.

The pivoted conveyor H will remain in the depressed position shown in Fig. 6 as long as the surplus cans are being recirculated but the moment removal of cans from the vertical receiving chutes E begins to take place the surplus number of cans will gradually disappear into the receiving chutes until a point is reached where the number of cans rolling down the pivoted chute H is not sufficient to maintain it in a depressed position. When this point is reached the counterbalance 4 returns the chute to normal position, that is, with its upper end in engagement with the adjusting screw 3 and when the chute returns to this position movement is again transmitted through the link 8 and rocker arm 9 to swing the member 11 out of engagement with the pin wheel 12. Shaft 14 will then be free to rotate and the delivery of cans from the main supply chute is again started, hence as long as the number of surplus cans being circulated is sufficient to maintain the chute H in a depressed position the delivery of cans from the main supply chute is shut off but when the number of surplus cans is sufficiently reduced the weight is insufficient to maintain the chute H depressed and the main supply is thus automatically opened.

By referring to Figs. 1 and 7, it will be noted that the conveyors B, C and D are supported by pulleys at opposite ends and that these are rotated by driving belts and pulleys such as shown at 15 and 16, see Fig. 7, the direction of rotation being that indicated by the arrows a. It should also be noted that the conveyors B, C, D, etc., are arranged in step formation or on different planes. This is an important feature as it permits a free distribution or flow of cans from one conveyor to another when an intermediate receiving chute is filled. Shaft 18 carrying one of the pulleys is provided with a disc 19 and a projecting pin 20. This engages the hook-shaped end 21 of a link 22. This link is connected to a crank arm 23, see Fig. 2, the crank arm being secured on a shaft 24 pivoted in the frame above the discharge end of the return chute. This shaft is provided with arms 5a which carry the stop member 5. A spring 25 is also connected with the crank 23, hence an oscillating movement is transmitted to the shaft 24 and the stop member 5, such oscillation being continuous. The oscillating movement of the stop member 5 is important as the discharge end of the chute H moves vertically to and away from the stop member, hence if a can should happen to align with the stop member it might become bent or crushed during return movement of the chute or it might become jammed and thereby prevent return movement of the chute to normal position, but by transmitting an oscillating movement to the stop member the objections above mentioned are eliminated.

The mechanism employed in the present system is exceedingly simple and cheap to manufacture. It requires comparatively little space and as it is entirely automatic in operation the cost of an operator may be entirely dispensed with.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a can feeding system of the character described the combination of a main can feeding device, the distributing conveyors and the can receiving chutes into which the cans in the distributing conveyors are discharged, a conveyor for removing surplus cans from one end of the distributing conveyors when the can receiving chutes are filled, a pivotally mounted chute adapted to receive the removed cans and to return them to the receiving end of the distributing conveyors, said pivoted chute adapted to maintain a raised position when less than a predetermined number of cans are passing therethrough, and adapted to swing about its pivot to a lowered position when more than a predetermined number of surplus cans are passing therethrough, and means actuated by the pivotal movement of the chute to regulate the delivery of cans from the main feeding device.

2. In a can feeding system of the character described the combination of a main can feeding device, the distributing conveyors and the can receiving chutes into which the cans in the distributing conveyors are discharged, a conveyor for removing surplus cans from one end of the distributing conveyors when the can receiving chutes are filled, a pivotally mounted chute adapted to receive the removed cans and to return them to the receiving end of the distributing conveyors, said pivoted chute adapted to maintain a raised position when less than a predetermined number of cans are passing therethrough and adapted to swing about its pivot to a lowered position when more than a predetermined number of surplus cans are passing therethrough, and means actuated by the pivotal movement of the chute to shut off the supply of cans from the main feeding device.

3. A can feeding system for supplying cans to a plurality of vertically disposed spaced chutes having open upper ends, which comprises conveyors extending between the upper ends of the chutes to convey cans to the chutes until they are filled and then to convey cans over and beyond the filled chutes, said conveyors being arranged in steps progressing downwardly in the direction of travel of the conveyors.

4. In a device for conveying cans having a movable chute and a stop member so associated with the chute that it will interrupt the passage of cans through the chute when the chute is in a certain position, means for oscillating the stop member while the chute is being moved toward it to avoid jamming of the cans as they are contacted by the stop member.

5. In combination with a can conveyor which comprises a chute, and means for raising and lowering one end of the chute, a constantly moving stop member to interrupt passage of the cans when the chute is in its raised position.

6. In a can conveyor of the character described comprising a can chute, a stop member associated with the chute to interrupt passage of cans therethrough, and means for effecting relative movement between the chute and stop member to permit the passage of cans through the chute, and means for constantly moving said stop member to avoid jamming of the cans.

7. The combination with a chute for conveying cans, of a rocker arm adapted to be positioned within the path of travel of cans in the chute to interrupt passage of the cans through the chute and means for oscillating said arm to prevent it from jamming cans in the chute.

ADOLF H. NELSON.